(12) United States Patent
Dumas

(10) Patent No.: US 11,105,884 B2
(45) Date of Patent: Aug. 31, 2021

(54) MOBILE DEVICE LOCATION TRACKING

(71) Applicant: Social Local, Inc., Santa Monica, CA (US)

(72) Inventor: Julio Jason Dumas, Santa Monica, CA (US)

(73) Assignee: SOCIAL LOCAL, INC., Santa Monica, CA (US)

( * ) Notice: Subject to any disclaimer, the term of this patent is extended or adjusted under 35 U.S.C. 154(b) by 430 days.

(21) Appl. No.: 16/002,961

(22) Filed: Jun. 7, 2018

(65) Prior Publication Data

US 2018/0357673 A1 Dec. 13, 2018

Related U.S. Application Data

(60) Provisional application No. 62/516,528, filed on Jun. 7, 2017.

(51) Int. Cl.
| | |
|---|---|
| G01S 5/00 | (2006.01) |
| G06Q 30/02 | (2012.01) |
| H04W 64/00 | (2009.01) |
| H04W 4/08 | (2009.01) |
| H04W 8/20 | (2009.01) |
| G01S 13/86 | (2006.01) |
| H04W 4/23 | (2018.01) |
| H04W 4/02 | (2018.01) |
| H04W 8/18 | (2009.01) |

(52) U.S. Cl.
CPC .......... G01S 5/0036 (2013.01); G01S 13/867 (2013.01); G06Q 30/0261 (2013.01); G06Q 30/0269 (2013.01); H04W 4/023 (2013.01); H04W 4/08 (2013.01); H04W 4/23 (2018.02); H04W 8/205 (2013.01); H04W 64/003 (2013.01); H04W 8/18 (2013.01)

(58) Field of Classification Search
CPC . G01S 13/867; G01S 5/0036; G06Q 30/0261; G06Q 30/0269; H04W 4/023; H04W 4/08; H04W 4/23; H04W 64/00; H04W 64/003; H04W 8/18; H04W 8/205
See application file for complete search history.

(56) References Cited

U.S. PATENT DOCUMENTS

| | | | | |
|---|---|---|---|---|
| 2003/0154126 | A1* | 8/2003 | Gehlot | G06Q 30/0277 705/14.53 |
| 2006/0149622 | A1* | 7/2006 | Baluja | G06Q 30/0269 705/14.53 |

(Continued)

*Primary Examiner* — Kashif Siddiqui
(74) *Attorney, Agent, or Firm* — Perkins Coie LLP

(57) ABSTRACT

An exemplary outdoor mobile device real-time location tracking system includes a telemetry system, a digital system, a server system, a camera system, and a demographic information system. The exemplary tracking system uses the digital system to scan the available frequencies. The exemplary tracking system also uses the telemetry system to determine the mobile devices located in a wireless range. The camera system may also be used to visually track the various mobile devices. The digital system initiates soft-handshake with mobile devices that allow the tracking system to obtain information about the mobile devices. With the information derived from the soft-handshake, the exemplary tracking system may utilize the demographic information system to obtain demographic information associated with the various mobile devices.

12 Claims, 5 Drawing Sheets

(56) References Cited

U.S. PATENT DOCUMENTS

| | | | | |
|---|---|---|---|---|
| 2015/0045063 A1* | 2/2015 | Mishra | ................. | H04W 4/029 455/456.2 |
| 2015/0293647 A1* | 10/2015 | Katabi | ................. | G06F 3/0433 345/173 |
| 2017/0179602 A1* | 6/2017 | Charvat | ............. | H04W 56/001 |

* cited by examiner

MOBILE DEVICE LOCATION TRACKING

PRIORITY CLAIMS AND RELATED PATENT APPLICATIONS

This patent document claims the priority to and the benefits of U.S. Provisional Application No. 62/516,528 entitled "MOBILE DEVICE LOCATION TRACKING" filed by Applicant Social Local, Inc. on Jun. 7, 2017, which is incorporated by reference as part of this patent document.

TECHNICAL FIELD

This patent document relates to using wireless communication signals to track and locate mobile devices and utilize that information to enhance digital advertising.

BACKGROUND

Mobile device tracking involves ascertaining the position or location of a mobile device that can assist marketing companies with information relevant for marketing products to various mobile phone users. The existing process of determining location can involve using a global positioning system (GPS). A GPS system can provide geolocation and time information for a mobile device to a GPS receiver anywhere on or near the Earth where there is an unobstructed line of sight to four or more GPS satellites. However, a GPS system can be available infrequently at least because it needs to be enabled from within an application of the mobile device.

SUMMARY

Currently, marketing companies may not be able to determine real-time mobile phone location to offer instant advertisements to the mobile device users. The exemplary embodiments in this document disclose a network infrastructure that uses multiple antennas to wirelessly communicate with mobile devices within a wireless range of the antennas. The exemplary embodiments also disclose that the network infrastructure is coupled to other existing wireless networks to monitor and track mobile device location in real time.

In an exemplary embodiment, an outdoor wireless network is provided for delivering location information of a mobile device in real-time. The outdoor wireless network comprises a telemetry system to locate and track a location of the mobile device, a digital system to wirelessly communicate with the tracked mobile device to obtain identification information from the tracked mobile device, and a computing device to communicate with the telemetry and digital systems.

The telemetry system includes a first antenna, a second antenna, and a first and second sets of telemetry antennas. The first antenna is mounted on a support structure and is configured to transmit a periodically generated first antenna detection signal and to receive a first set of reflected signals from one or more wireless antennas of the mobile device. The second antenna is mounted on the support structure and is configured to transmit a periodically generated second antenna detection signal and to receive a second set of reflected signals from the one or more wireless antennas of the mobile device. The first set of telemetry antennas mounted on the support structure and configured to receive the first set of reflected signals. The second set of telemetry antennas mounted on the support structure and configured to receive the second set of reflected signals.

The digital system comprises a plurality of wireless access points mounted on the support structure and configured to transmit wireless signals to and receive wireless signals from the mobile device.

The computing device is in communication with the first and second antennas, the first set of and second set of telemetry antennas, and the wireless access points. The computing device comprising a processor configured to perform a method comprising determining a first set of available wireless frequencies to use for the first antenna and the first set of telemetry antennas, determining a second set of available wireless frequencies to use for the second antenna and the second set of telemetry antennas, instructing, using the first and second set of available wireless frequencies, a first signal generator and a second signal generator to periodically generate the first and second antenna detection signals for transmission by the first and second antennas, respectively, determining the location of the tracked mobile device in response to the receiving of the first set of reflected signals or in response to the receiving of the second set of reflected signals, obtaining, using the wireless access points, media access control (MAC) address and offline website data from the mobile device, wherein the offline website data includes cached data, one or more cookies, or browser history information, obtaining, from a server based on the collected MAC address and the offline website data, demographic information about a user of the mobile device, and sending to the mobile device selective information based on the obtained demographic information about the user of the mobile device.

In some embodiments, the selective information includes an advertisement displayed on a splash page of the at least one mobile device. In some embodiments, the method further comprises determining that at least two mobile devices are associated with the same demographic information about users of the at least two mobile devices, combining onto a same virtual local area network (VLAN) the at least two mobile devices that are in communication with the wireless access points, wherein the VLAN is managed by the wireless access points, and sending to the at least two mobile devices on the same VLAN a second selective information based on the same demographic information about users of the at least two mobile devices. In some embodiments, the second selective information includes an advertisement displayed on splash pages of the at least two mobile devices.

In some embodiments, the first signal generator is configured to receive the first set of reflected signals from the first antenna and the first set of telemetry antennas, and the second signal generator is configured to receive the second set of reflected signals from the second antenna and the second set of telemetry antennas. In some embodiments, the location of the mobile device is determined by measuring, using the first signal generator, a first signal strength indicator of the first antenna detection signal at a predetermined distance from a first transmitter of the first antenna, measuring, using the first signal generator, a second signal strength indicator of each of the first set of reflected signals, and determining a first location of the mobile device using the first and the second signal strength indicators.

In some embodiments, the location of the mobile device is determined by measuring, using the second signal generator, a third signal strength indicator of the second antenna detection signal at a predetermined distance from a second transmitter of the second antenna, measuring, using the second signal generator, a fourth signal strength indicator of each of the second set of reflected signals, and determining a second location of the mobile device using the third and the fourth signal strength indicators. In some embodiments, the method further comprises determining that the first location is same as the second location. In some embodiments, the first signal generator is used to determine the first set of available wireless frequencies, and the wireless access points are used to determine the second set of available wireless frequencies.

In some embodiments, the outdoor wireless network further includes one or more cameras mounted on the support structure and in communication with the computing device, wherein the one or more cameras are configured to obtain video of the mobile device within a field of view of the one or more cameras, and the processor of the computing device is configured to perform the method further comprising receiving, from the one or more cameras, video of the mobile device, and obtaining, using the one or more cameras, location information of the mobile device.

In some embodiments, the location of the mobile device is determined to be within three feet of actual location of the mobile device. In some embodiments, the first antenna is a dielectric lens antenna and the second antenna is a parabolic antenna.

In another exemplary embodiment, a method of processing wireless devices is disclosed to optimize wireless channel utilization. The exemplary the method comprises receiving, using a wireless access point, a media access control (MAC) address and offline website data from a mobile device, where the offline website data is stored on the mobile device and includes cache, one or more cookies, or browser history information, and the mobile device is in communication with the wireless access point using a first wireless channel. In response to determining, using the MAC address, that the mobile device has not been previously processed by the wireless access point: moving the mobile device from the first wireless channel to a second wireless channel, and generating an identifying information that includes information about the mobile device, where the identifying information includes the MAC address of the mobile device. In response to determining, using the MAC address, that the mobile device has been previously processed by the wireless access point: moving the mobile device from the first wireless channel to a third wireless channel, and locating and updating a previously generated identifying information to include starting and ending dates and starting and ending times that describes a length of a session during which the mobile device is in communication with the wireless access point. In response to determining that the offline website data for the mobile device moved to the third wireless channel was not previously synced to a server: moving the mobile device to a fourth wireless channel, adding the mobile device to a first virtual local area network (VLAN) operating on the fourth wireless channel, receiving, based on the received MAC addresses and the offline website data, demographic information about a user of the mobile device, and sending to the mobile device on the first VLAN a first selective information based on the demographic information of the user of the mobile device.

In some embodiments, the exemplary method further comprises in response to determining whether the offline website data for the mobile device moved to the third wireless was previously synced to the server: moving the mobile device to a fifth wireless channel, adding the mobile device to a second VLAN operating on the fifth wireless channel, and sending to the mobile device on the second VLAN a second selective information based on a previously obtained demographic information associated with the user of the mobile device.

In some embodiments, the first selective information or the second selective information includes an advertisement displayed on a splash page of the mobile device. In some embodiments, the generating of the identifying information includes creating a file or creating a database entry.

In yet another exemplary aspect, the above-described methods are embodied in the form of processor-executable code and stored in a computer-readable program medium.

In yet another exemplary embodiment, a device that is configured or operable to perform the above-described methods is disclosed.

These and other aspects, features and their implementations are described in greater detail in the drawings, the description and the claims.

DETAILED DESCRIPTION

This document discloses a technology and various technical features that can be used to track location of a mobile device that is either stationary or travels through a region such as a city, collect information from the mobile device, and gather additional demographic information about a user based on the information obtained from the mobile device. One benefit of the disclosed technology is that it can provide access to an accurate, real-time location of stationary or moving mobile devices and it can also provide demographic information obtained about a user of the mobile device. The location information combined with demographic information can provide mobile advertisers with information that they can use to target a particular mobile advertisement to a particular mobile device user. A mobile device may include, for example, a cell phone, a smartphone, a tablet, an Internet-of-Things (IoT) capable device, an activity tracker, a drone, a laptop, or a car equipped with wireless capabilities.

Figure 1:
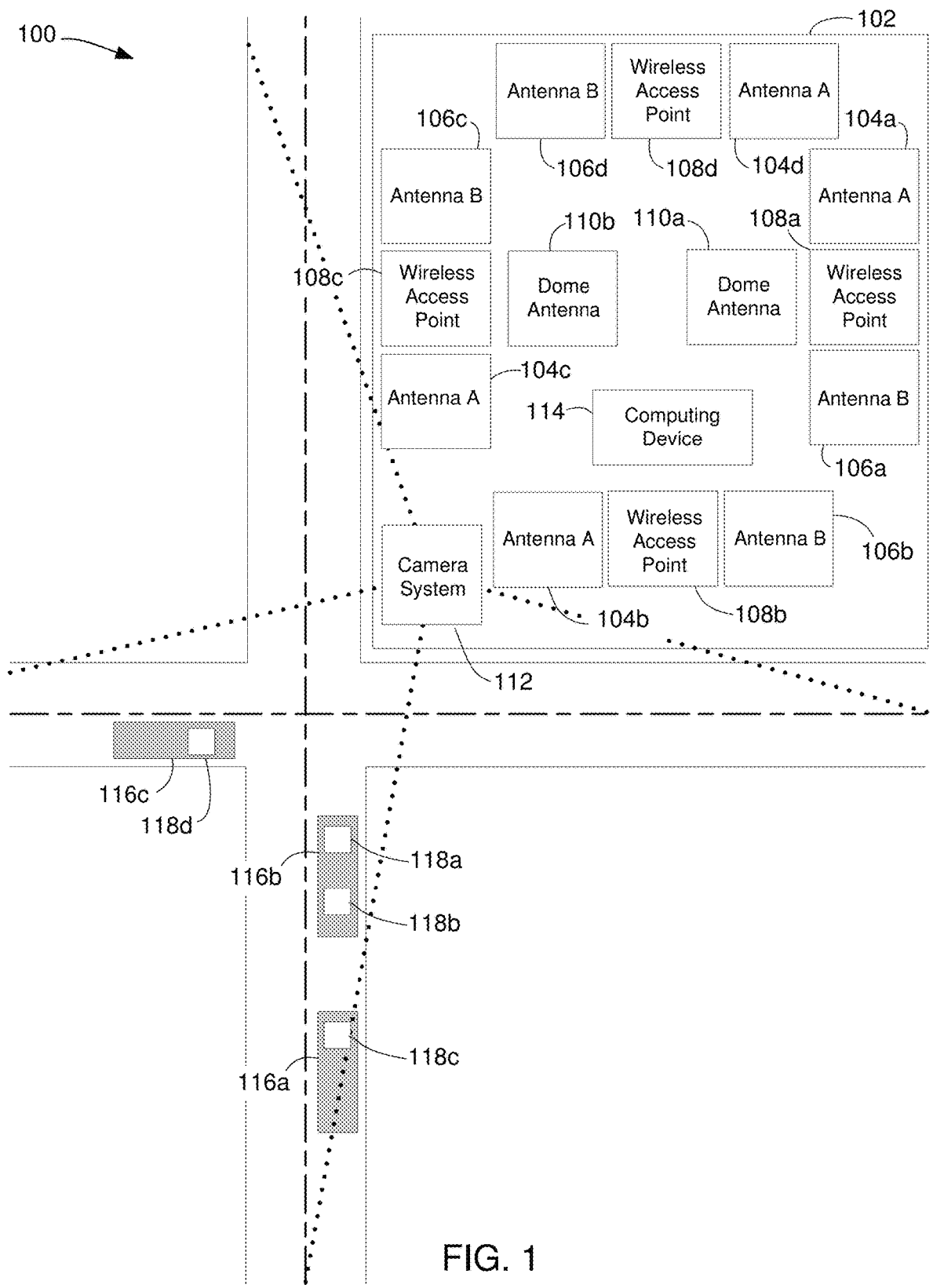
FIG. 1 illustrates an exemplary embodiment for a wireless device tracking system.

FIG. 1 illustrates an exemplary embodiment for a wireless device tracking system 100 at a traffic intersection. The wireless device tracking system tracks the locations of the mobile devices 118a-118d in vehicles 116a-116c that may be moving or stationary. The wireless device tracking system 100 may be installed on a support structure 102, such as a cell tower, a side or a top of a building or truck or trailer, a mobile phone mast, or a base station. Optionally, the wireless device tracking system 100 may be installed on a support structure 102 such as on top of a home or an office building.

In an exemplary embodiment, the wireless device tracking system 100 may include different sub-systems that operate together to track mobile devices and to obtain marketing information relevant to the mobile devices. For example, one of the sub-systems is a telemetry system that can locate and track multiple mobile devices. The features of the telemetry system are further explained in Section I below. A second sub-system is a digital system that can wirelessly communicate with the tracked mobile devices using, for example, wireless fidelity (Wi-Fi) signals as further described in Section II below. A third sub-system is a server system that can control and process the information gathered from the telemetry system, digital system, camera system, and the demographic information system as further described in Section III below. A fourth sub-system is a camera system that can capture images of an area where some of the mobile devices are tracked as further described in Section IV below. A fifth sub-system is a demographic information system that can obtain marketing information relevant to the tracked mobile devices as further described in Section V below. The exemplary details of each of these sub-systems are further described in Section I to Section V below.

I. Telemetry System

In FIG. 1, the wireless device tracking system 100 includes a telemetry system that includes two antennas 110a and 110b, a first set of telemetry antennas 104a-104d, and a second set of telemetry antennas 106a-106d. The two broadcast antennas 110a and 110b are mounted on the support structure 102 so that the two antennas 110a and 110b may be located adjacent to the telemetry antennas and/or wireless access points of system 100. In some embodiments, the two antennas 110a and 110b may be mounted on opposite sides of the support structure. The first antenna 110a may be a dielectric lens antenna, and the second antenna 110b may be a parabolic or spherical lens antenna. As further explained in FIG. 2A below, the antennas 110a and 110b are configured to periodically transmit antenna detection signals to the mobile devices and are configured to receive wireless reflected signals from the antennas of the mobile devices. The antenna detection signal can be considered a ping.

FIG. 1 also shows a first set of telemetry antennas 104a-104d (Antennas A) and a second set of telemetry antennas 106a-106d (Antennas B) mounted on the support structure 102. In some embodiments, each set of telemetry antennas may be mounted on four sides of the support structure so that each telemetry antenna from one set is located approximately 90 degrees from another telemetry antenna from the same set. As further explained in FIG. 2A below, the first set of telemetry antennas 104a-104d is configured to receive the first set of reflected signals from the mobile devices, and the second set of telemetry antennas 106a-106d is configured to receive the second set of reflected signals from the mobile devices. Since the antennas 110a and 110b also receive the first and second set of reflected signals, respectively, the first and second set of telemetry antennas provide redundancy. Furthermore, antennas 110a and 110b can also provide additional frequency bandwidth at least because the system can use antennas 110a and 110b to provide a redundant path from a same mobile device for more frequency saturation. For example, as explained below, antenna 110a can be configured to operate using one or more frequencies in a first set of frequencies, and antenna 110b can be configured to operate using one or more frequencies in a second set of frequencies.

The antennas in the telemetry system and the wireless access points 108a-108d operate in pre-determined frequency ranges. The first antenna 110a and the first set of telemetry antennas 104a-104d can operate in the 1-100 GHz range. For instance, the first antenna 110a transmits and receives wireless signals at about 60 GHz, and each of the first set of telemetry antennas 104a-104d (Antennas A) receive wireless signals at about 60 GHz. The second antenna 110b, the second set of telemetry antennas 106a-106d, and the wireless access points 108a-108d can operate in the 2.4 GHz, 3.5 GHz, 5 GHz, or 6 GHz range. For example, the second antenna 110b transmits and receives wireless signals having frequencies that range from 2.4 GHz to 2.5 GHz and/or from 5.15 GHz to 5.85 GHz, and each of the second set of telemetry antennas 106a-106d (Antennas B) receive wireless signals having frequencies that range from 2.4 GHz to 2.5 GHz and/or from 5.15 GHz to 5.85 GHz. A benefit of using two antennas 110a-110b is that it can be used to expand the wireless range by operating the antennas at different frequencies at the same time. In some embodiments, a single antenna may be used and mounted on the support structure. The single antenna may operate in the 2.4 GHz, 3.5 GHz, 5 GHz, 5G and IoT frequencies between 1 GHz and 100 GHz, 67 GHz, or 60 GHz range.

In some embodiments, the wireless device tracking system 100 may also include includes Bluetooth sensors, radio frequency identification (RFID) sensors, Internet-of-Things (IoT) or 5G communication gear, or cell carrier gear mounted on the support structure 102 and configured to transmit wireless signals to and receive wireless signals from a plurality of mobile devices, vehicles, Bluetooth devices, RFID tags, drones, or any device capable of utilizing radio frequencies for operation.

Figure 2A:
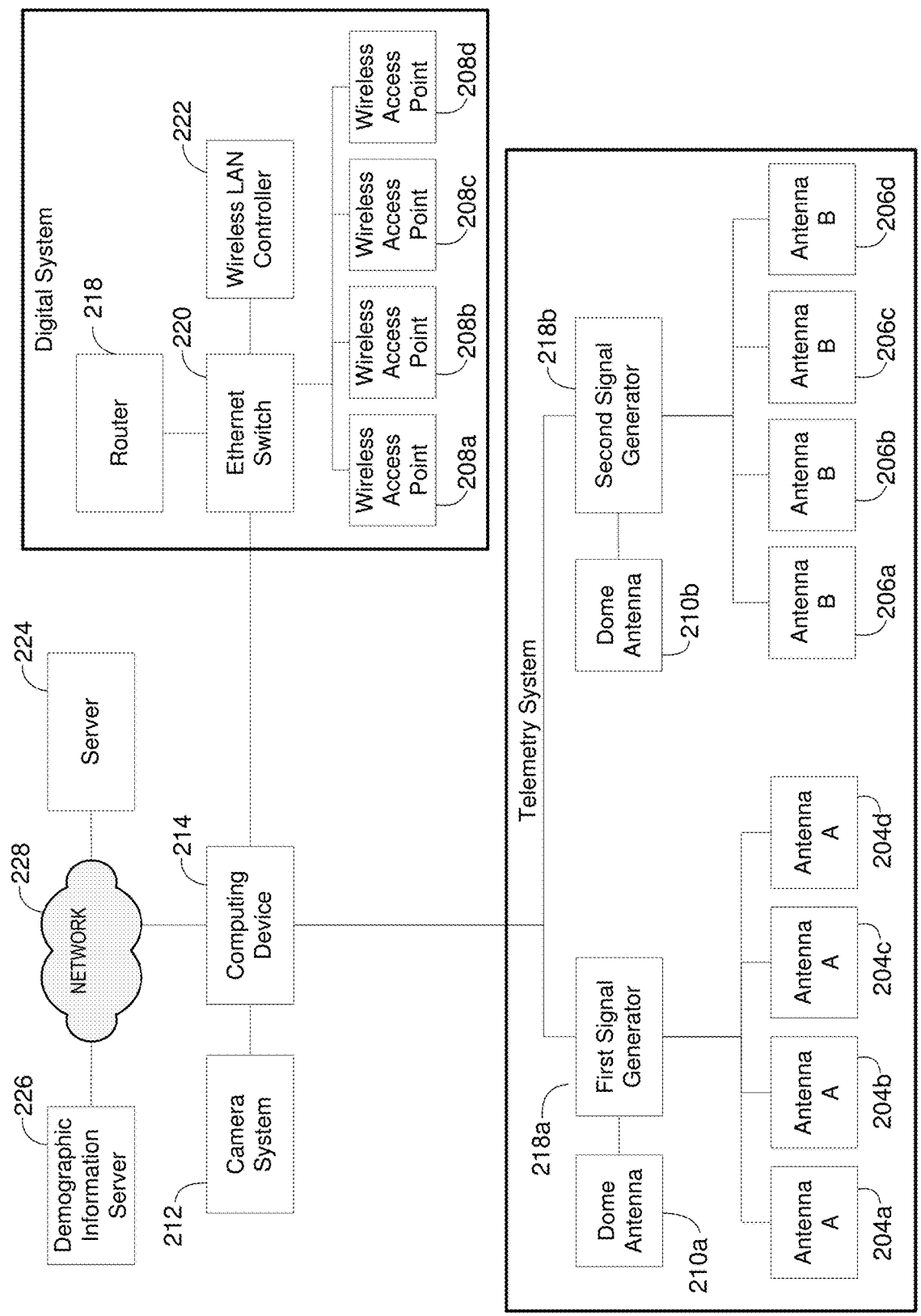
FIG. 2A illustrates an exemplary block diagram of the wireless device tracking system.
Figure 2B:
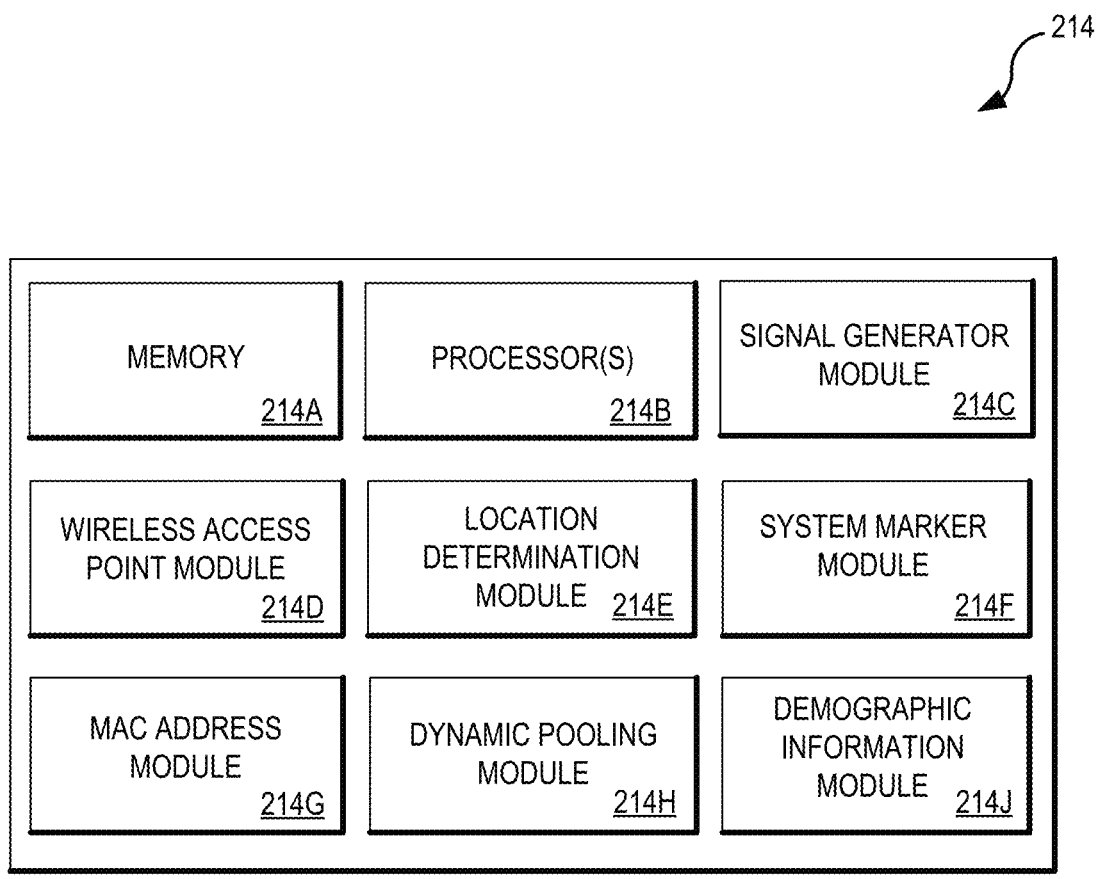
FIG. 2B shows a block diagram of the computing system of the wireless device tracking system.

FIG. 2A illustrates an exemplary block diagram of the wireless device tracking system to illustrate the exemplary radio frequency operations of the wireless device tracking system. A computing device 214 is communicably coupled to or is in communication with the first signal generators 218a, the second signal generator 218b, the Ethernet switch 220, the router 218, and the camera 212. The computing device 214 may be one or more computers or one or more servers. At least some of the antennas and devices shown in FIG. 2B are the same as the antennas and devices shown in FIG. 1. For instance, the computing device 114 and 214 are the same, first set of telemetry antennas 104a-104d and 204a-204d are the same, and so on.

The bottom of FIG. 2A shows a telemetry system that includes several antennas and two signal generators. The first signal generator 218a is connected to the first antenna 210a and to the first set of telemetry antennas 204a-204d. The second signal generator 218b is connected to the second antenna 210b and to the second set of telemetry antennas 206a-206d. As further explained below, the computing device 214 can use the first and second signal generators 218a-218b to transmit and receive wireless signals using the first and second antennas 210a-210b, and the first set and second set of telemetry antennas 204a-204d, 206a-206d. In some embodiments, the first signal generator may operate over a frequency range of 1 GHz to 100 GHz. In some embodiments, second signal generator may operate over a frequency range of 1 MHz to 6 GHz.

FIG. 2B shows a block diagram of the computing device 214 used in the wireless device tracking system. The computing device 214 may include one or more processors 214B that can read code from the memory 214A, and perform operations associated with the other blocks or modules shown in FIG. 2B. For instance, the signal generator module 214C of the computing device 214 instructs the first and second signal generators 218a-218b (shown in FIG. 2A) to periodically generate antenna detection signals. Based on the generated antenna detection signals, antennas 210a and 210b periodically transmit antenna detection signals to the mobile devices located within the transmission range of the antennas 210a and 210b. The antenna detection signals may include, for example, a time domain pulse signal, pulse repetition frequency (PRF) (Pulse Doppler Radar), or continuous wave radar (unmodulated and modulated frequencies).

The signal generator module 214C of the computing device 214 determines, using the first signal generator 218a, the first set of available wireless frequencies to use for the first antenna 210a and the first set of telemetry antennas 204a-204d. The signal generator module 214C can monitor the wireless environment using the first signal generator 218a so that the first antenna 210a does not broadcast on competing frequencies being utilized by other wireless devices not associated with the wireless device tracking system but operating within the wireless environment of the wireless device tracking system. The signal generator module 214C can create and update a list of one or more frequencies or channels available for transmission by the first antenna 210a. For instance, if the signal generator module 214C uses the first signal generator 218a to determine that one or more frequencies are being used by the other wireless devices not associated with the wireless device tracking system, then the signal generator module 214C can temporarily remove the competing frequencies from the list of frequencies available for transmission by the first antenna 210a. As more frequencies become available, the first signal generator 218a recognizes the available frequencies and the signal generator module 214C may then add those frequencies to the list of available frequencies to transmit the antenna detection signal. In some embodiments, the list of available wireless frequencies is determined daily to make sure the information it is providing is accurate.

The signal generator module 214C maintains and uses the first set of available wireless frequencies to instruct the first signal generator 218a to periodically generate the first antenna detection signal. The first antenna 210a coupled to the first signal generator 218a periodically transmits the periodically generated first antenna detection signal. This process can be alternated and repeated until all frequencies in the first set of available frequencies are covered by the system. In an exemplary embodiment, the first antenna detection signal may be transmitted between 100 to 10,000 times per minute. When the first antenna detection signal is transmitted, the first signal generator 218a measures a first signal strength indicator of the first antenna detection signal at a predetermined distance from a first transmitter of the first antenna 210a. When the first antenna 210a periodically transmits the first antenna detection signal, the first antenna detection signal reaches the wireless antennas of the mobile devices that are located within a wireless range of the first antenna detection signal. When the first antenna detection signal reaches the wireless antennas of the mobile device, the detection signal bounces back as wireless reflected signals. The first antenna 210a and the first set of telemetry antennas 204a-204d are configured to receive a first set of reflected signals from the mobile device's wireless antennas. The first signal generator 218a is configured to receive the first set of reflected signals from wireless antennas in the plurality of mobile devices. When the first set of reflected signals is received, the first signal generator 218a measures a second signal strength indicator of each of the first set of reflected signals.

In FIG. 2B, the location determination module 214E analyzes the first antenna detection signal's and the first set of reflected signals' received signal strength indicator (RSSI) to locate and track the plurality of mobile devices. The location determination module 214E determines the location of the plurality of mobile devices using the first and the second signal strength indicators measured by the first signal generator 218a. In some embodiments, the location determination module 214E uses Equation 1, shown below, to calculate location of the plurality of mobile devices:

$$\text{RSSI[dBm]} = -(10 * n * \log_{10}(d) + A \text{ [dBm]}) \quad \text{(Eq. 1)}$$

where A is the measured first signal strength indicator at one meter of distance, RSSI is the measured second signal strength indicator, n is the propagation path loss exponent, and d is the distance of a mobile device from antennas 210a and 210b, and the telemetry antennas. The values for n can be chosen based on the following table:

TABLE 1

Values for the Propagation Path Loss Exponent

| n | Environment |
| --- | --- |
| 2.0 | Free space |
| 1.6 to 1.8 | Inside a building, line of sight |
| 1.8 | Grocery store |
| 1.8 | Paper/cereal factory building |
| 2.09 | A typical 15 m × 7.6 m conference room with table and chairs |
| 2.2 | Retail store |
| 2 to 3 | Inside a factory, no line of sight |
| 2.8 | Indoor residential |
| 2.7 to 4.3 | Inside a typical office building, no line of sight |

In some embodiments, a computing device 214 can determine a location of a mobile device to be within three feet or less of an actual location of the mobile device.

FIG. 2A shows that the computing device 214 is communicably coupled to or is in communication with the plurality of wireless access points. The computing device 214 may determine, using the plurality of wireless access points 208a-208d, the second set of available wireless frequencies to use for the second antenna 210b and the second set of telemetry antennas 206a-206d. In FIG. 2B, the wireless access point module 214D can monitor the wireless environment using the wireless access points so that the second antenna 210b does not broadcast on competing frequencies being utilized by other wireless devices not associated with the wireless device tracking system but operating within the wireless environment of the wireless device tracking system. The wireless access point module 214D can query the wireless access points to determine what frequencies are open or unused by the wireless access points. The wireless access point module 214D can create and update a list of one or more frequencies or channels available for transmission by the second antenna 210b. For instance, if the wireless access point module 214D uses the wireless access points to determine that one or more frequencies are being used by the other wireless devices not associated with the wireless device tracking system, then the wireless access point module 214D can temporarily remove the competing frequencies from the list of frequencies available for transmission by the second antenna 210b. As more frequencies become available, the wireless access points recognize the available frequencies and the wireless access point module 214D may then add those frequencies to the list of available frequencies to transmit the antenna detection signal. In some embodiments, a software development kit (SDK) can pulls the list of available wireless frequencies from the wireless access points and dynamically uses the available frequencies. In some embodiments, the list of available wireless frequencies is determined daily to make sure the information it is providing is accurate.

One benefit of performing frequency monitoring using a signal generator and the wireless access points is that can allow the computing device 214 to choose as many different frequencies as possible to use for transmitting the antenna device signal. Thus, the computing device 214 can determine an opening in the spectrum and sends the antenna detection signal at those frequencies when available.

The wireless access point module 214D maintains and uses the second set of available wireless frequencies to instruct the second signal generator 218b to periodically generate the second antenna detection signal. The second antenna 210b coupled to the second signal generator 218b periodically transmits the periodically generated second antenna detection signal. This process can be alternated and repeated until all frequencies in the second set of available frequencies are covered by the system. In an exemplary embodiment, the second antenna detection signal may be transmitted between 100 to 10,000 times per minute. When the second antenna detection signal is transmitted, the second signal generator 218b measures a first signal strength indicator of the second antenna detection signal at a predetermined distance from a second transmitter of the second antenna 210b. When the second antenna 210b periodically transmits the second antenna detection signal, the second antenna detection signal reaches the wireless antennas on mobile devices within range and bounces back as reflected signals. The second antenna 210b and the second set of telemetry antennas 206a-206d are configured to receive a second set of reflected signals from the mobile device's wireless antennas. The second signal generator 218b is configured to receive the second set of reflected signals from wireless antennas in the plurality of mobile devices. When the second set of reflected signals is received, the second signal generator 218b measures a second signal strength indicator of each of the second set of reflected signals.

In FIG. 2B, the location determination module 214E analyzes the second antenna detection signal's and the second set of reflected signals' received signal strength indicator (RSSI) to locate and track the plurality of mobile devices. In some embodiments, the location determination module 214E uses Equation 1, discussed above, to calculate location of the plurality of mobile devices using the second antenna detection signal and the second set of reflected signals. In some embodiments where the same mobile device receives both the first and second detection signals and reflects the first and second set of reflected signals, the location determination module 214E can determine that the first location information calculated from the first detection and reflected signals is the same as the second location information calculated from the second detection and reflected signals. Thus, in some embodiments, the location determination module 214E can keep a list of location information for mobile devices based on the transmissions and receptions by the first antenna 210a and the first set of telemetry antennas 204a-204d and another list of location information for the mobile devices based on the transmissions and receptions by the second antenna 210b and the second set of telemetry antennas 206a-206d.

As mentioned above, based on the signals transmitted and received by the telemetry system, the location determination module 214E can determine the locations of the mobile devices located within the wireless range of the telemetry system antennas. Since the antenna detection signal and the reflected signals are transmitted and received regularly, the location determination module 214E can track movements of the mobile devices. As the system receives information back from transmitting the antenna detection signal, on each of its antennas, the location determination module 214E can process the received information by using algorithms related to Equation 1 to determine distances to the mobile devices, at multiple angles, at multiple frequencies, and for things such as cars, cell phones, internet of things (IoT) devices that bounces back a reflected signal. In some embodiments, the location determination module 214E can determine the device location by time-stamping the transmitted and received signals to obtain information such as round-trip timing. The location determination module 214E may utilize fall-off algorithms to drop the weakest information about a tracked wireless device. One benefit of using fall-off algorithms is that it drastically improves quality control.

The location determination module 214E can determine whether the reflected signals are reflected from a same device. The location determination module 214E can analyze the frequencies of each of the transmitted and reflected signals, and can pool similar return values of the reflected signals as being associated with the same device. For example, when the location determination module 214E determines that multiple frequencies from antennas 210a and 210b show the same object, occupying the same space, then the location determination module 214E pools together or combines the frequency RSSI values of the reflected signals to further analyze whether the two objects very close together, or the same object.

The location determination module 214E can distinguish moving target in the presence of echoes from the stationary objects. The location determination module 214E can compare the received echoes with those received in previous sweep. The echoes from stationary objects may have same phase and hence may be cancelled, while moving targets may have some phase change. If the shifted echo coincides with any of the frequency components in the frequency domain of the received signal, the location determination module 214E may not be able to measure target velocity. Such velocities are called blind speeds.

FIG. 2B shows a system marker module 214F that generates an identifying information such as a system marker for each wireless device that the location determination module 214e tracks. The system marker may be a file with a unique identifier as a file name and may include information such as date and time of the session. The system marker can uniquely identify a mobile device and can be associated with the mobile device's MAC address. For example, the system marker file may include the MAC address and/or the IP address in its contents or the system marker file may include the MAC address as its file name. As another example, the system marker for a device may be an entry in a database associated with another entry such as a MAC address or location information about that same device. The system marker for each tracked wireless device can be stored under the wireless device's media access control (MAC) address obtained by the digital system, as further explained in Section II below. The system marker module 214F can store the determined location information of the wireless devices in the system markers to track the movements of the wireless devices. Information gathered from the location determination module 214E and from the digital system (as further explained in Section II) can be stored by the system marker module 214F in the system markers of the mobile devices.

As mentioned above, the location determination module 214E can determine whether a mobile device is stationary. For example, if a mobile device user is sitting still, the exact same data for the antenna detection signal and the reflected signals may be received by the system. Once the location determination module 214E recognizes this, it can overwrite the bread crumb information associated with the user's tracked mobile device and stored in the system marker of the tracked mobile device. Once this begins, a system timer of the location determination module 214E can begin tracking how long it has noticed the object has stayed still. Such a tracking method can be used to track when people stop to various reasons, including shopping at a particular location or eating at a particular restaurant. One benefit of such a tracking method is that it allows for migratory pattern studies and marketing abilities. In some embodiments, a computing device or a server can track and analyze migratory patterns of each of the mobile devices passing through the wireless device tracking system. This tracking information is stored on the system marker in the computing device 214. The system marker is stored under the folder specific to the MAC address of the tracked device. The system marker may be stored locally on the computing device 214, the local server, and the host server for the network. The system marker related information may also be stored on another computing device located off-site.

In some embodiments, the telemetry system related data can be stored for six months on a computing device located in or close to the support structure. If the local computing device has stored a system marker for a mobile device it tracked but does not obtain any tracking information about the same device for more than six months, then that mobile device's information is moved to archive storage such as an offsite computing device. The system marker information for the devices that pass through the telemetry system every day may be stored locally for quick and easy access.

In some embodiments, the location determination module 214E can identify the latitude and longitude of local business. These values are tracked by the location determination module 214E and added to any stop information about a mobile device. For example, the location determination module 214E can determine how long a mobile device had stopped at a particular latitude and longitude. This location determination module 214E can also determine how long a mobile device had stopped at a particular location based on the time when the mobile device stopped moving and the time when the mobile device started to move. This information can be stored in the system marker and can be available for processing in real-time.

Returning to FIG. 1, the telemetry antennas 104a-104d and 106a-106d can be full range antennas that allow the telemetry system to utilize the broadcasting frequencies, such as those related to mobile carriers, RFID, drones, Bluetooth, corporate beacons, and smart vehicles that pass by the antennas of the wireless device tracking system 100. This data is combined with the data obtained by the telemetry system to optimize the system and locate the device with these broadcasts. In some embodiments, the mobile device frequencies are received and processed as continuous wave frequencies and run through the same calculations as the antenna detection signal operation to determine their location and tie together devices on the digital system and devices on the telemetry system.

II. Digital System

FIG. 1 shows that the wireless device tracking system 100 includes a digital system that comprises a plurality of wireless access points 108a-108d. The wireless access points 108a-108d can be mounted on the support structure 102. The plurality of wireless access points may be located on four sides of the support structure so that each wireless access point is located approximately 90 degrees from another wireless access point. Each of these wireless access points can have approximately a half mile radius of coverage at full power. The wireless access points can utilize both hidden and public Service Set Identifiers (SSIDs). The settings related to SSID and power levels may be dynamically controlled by the computing device 114 through a router (not shown in FIG. 1).

The plurality of wireless access points 108a-108d are configured to transmit wireless signals to and receive wireless signals from a plurality of mobile devices 118a-118d. In some embodiments, the wireless signals transmitted and received by the wireless access points can be Wi-Fi signals operating using IEEE 802.11 standard in the 2.4 GHz, 3.5 GHz, or 5 GHz range. Further, as explained in Section I above, the plurality of wireless access points 108a-108d monitor the surrounding wireless environment and recognize the channels or frequencies being used by the surrounding networks. The wireless access points operate in the unlicensed frequency range.

In some embodiments, the wireless access points can maintain the data offload initiative and the voice over Wi-Fi (VoWiFi) guidelines. One benefit of having wireless access points with these features is that a user's mobile device identifies the exemplary wireless access points as enterprise quality and increases its wireless antenna power to maintain connection with the wireless device tracking system. Another benefit of the exemplary wireless access points is that the mobile device can use them as an alternative backhaul source if their primary sources, such as a cellphone tower or other wireless sources, are degraded.

FIG. 2A shows an exemplary embodiment showing the interconnection between the wireless access points and the various other components. As shown in FIG. 2A, the wireless device tracking system also includes an Ethernet switch 220 connected to a router 218, a wireless LAN controller 222, and the plurality of wireless access points 208a-208d. The router 218 is configured to control functions of the Ethernet switch 220. For example, the router 218 may be used to communicate with the Ethernet Switch to control splash page generation, splash page integration, channel control, or user control. The wireless LAN controller is configured to store certificate and authentication information for the plurality of wireless access points. In some embodiments, the wireless access points 208a-208d may be connected, through a SDK, to the wireless access point module 214D (shown in FIG. 2B) of the computing device 214. In some embodiments, the wireless access point module 214D, through SDK, can constantly monitor, manipulate, and extracts information from the wireless access points through both the router and wireless LAN controllers. In some embodiments, the wireless device tracking system may also include a plurality of power converters (not shown in FIG. 2A) configured to send power over Ethernet to the plurality of wireless access points. Each power converter may be connected in series between the Ethernet switch and one of the wireless access points. Each power converter includes an input Ethernet connector connected to an Ethernet port on the Ethernet switch and an output Ethernet connector connected to a power-over-Ethernet input of one of the access points.

In an exemplary embodiment, the wireless access point module 214D can use a SDK to actively query the wireless access points 208a-208d for the open channels or frequencies. The wireless access point module 214D can also use the SDK to pool or combine onto as few channels as possible the wireless access point channels that are used by the mobile devices to wirelessly connect to the wireless access points. One benefit of combining the used channels is to allow for more channels to be used to generate and transmit the antenna detection signal. As explained in Section I above, the wireless access point module 214D can also use the SDK to receive information from the wireless access points 208a-208d regarding the channels or frequencies that are available for the antenna detection signal transmission.

The wireless access point module 214D may control, through an SDK, the wireless access points' ability to control the traffic or channel loading of the system. For example, as further explained in FIG. 4 below, when a wireless access point module 214D recognizes and processes the devices, the wireless access point module 214D may pool or combine the devices with other processed devices onto as few channels as possible, leaving open channels or frequencies that can be used for the soft handshake process as described below. Some channels, or frequency blocks, may be removed from the digital system operation pool so there is at least one open frequency to operate the telemetry system's transmission of the antenna detection signal. This can be done in the enterprise switch graphical user interface (GUI) or controller GUI of the wireless access points.

In some embodiments, a wireless access point connects with a user's mobile device to achieve a soft handshake. During the soft handshake, the wireless access point module 214D can obtain the mobile device's MAC address and offline website data through the wireless access point. The offline website data is stored in the mobile device and may include cache, history, one or more cookies, or browser history information. In some embodiments, the wireless access point module 214D may use the offline website data to get from third party additional information, for example, marketing information for programmatic advertising. The third party may be an Ad Exchange, credit bureau, publishers, or advertisement companies. For each new tracked device, the wireless access point module 214D can store the MAC address and offline website data in a system marker (as described in Section I above). In some embodiments, a system marker for a device is identified by the MAC address. If a user's mobile device has been tracked before, the wireless access point module 214D can find the system marker associated with that mobile device's MAC address. If the wireless access point module 214D obtains updated offline website data, the retrieved system marker can be updated with the updated offline website data.

In some embodiments, the location determination module 214E can work with the basic location services of the wireless access points 208a-208d to determine the number of devices that are in communication with the wireless access points and that should be tracked with the telemetry system using the techniques described in Section I. The benefits of choosing Wi-Fi location-based services of the wireless access points are high compatibility, frequency availability, and the widespread use of Wi-Fi in mobile devices that allow for signals to more easily travel through obstruction like door, walls, and vehicles. The basic location services of the wireless access points are the location abilities of the digital system.

Further, the basic location services can also allow the system marker module 214F to properly assign the system marker so that the same mobile device tracked by the mobile device tracked by the telemetry and the digital systems is assigned the same system marker. For example, the wireless access point module 214D can use the wireless access points to measure the tracked mobile device's RSSI so that the wireless access point module 214D can determine the location of the device based off of the tracked mobile device's RSSI. Specifically, during the soft-handshake process the wireless access point module 214D obtains using a wireless access point the mobile device's MAC address, IP address, and/or offline website data and can measures the RSSI value of the signal received from the mobile device. The wireless access point module 214D can compare the RSSI value measured from the wireless access point with the RSSI value measured from the signal generator to match the data obtained from a mobile device with the location of the mobile device. Thus, the computing device 214 can recognize that it is tracking a mobile device in same space and time with both the digital system and the telemetry system, and the information from both of these systems show a device in the same space or time so the proper information can be saved to a system marker.

The wireless access points can be location aware in real-time so that the wireless access point module 214D can obtain a timestamp associated with the signal received by the wireless access points. The wireless access point module 214D can use the timestamps from the wireless access points to further correlate the data received by the wireless access points to the telemetry antennas' received reflected signals. The wireless access point module 214D can log or store the timestamp location information such as latitude and longitude, and/or as further explained below in Section IV, the camera grid location of the mobile devices located with the wireless range of the system 100.

As discussed above, the telemetry system generates location information based on the periodic transmission of the antenna detection signals and the reception of the reflected signals that bounce back from one or more antennas on the user's mobile device. The system marker module 214F assigns a system marker for the user's movements though the tracking system. The location information collected from the telemetry system is stored in the system marker so it can be used by the other systems on the wireless device tracking system and for systems on other wireless device tracking systems. In addition, the system marker module 214F can store historical data for the mobile device if the wireless access point has achieved soft handshake with the same mobile device within a certain historical period.

In some embodiments, once the computing device 214 recognizes that the telemetry system and the wireless access points have a match, such as when a location of a mobile device is tracked by the telemetry and digital systems, or when a wireless access point performs soft-handshake with the mobile device, it can begin tracking that mobile device and storing all the data obtained by the telemetry antennas and wireless access points on a system marker associated with a mobile device. The telemetry system can input all of the location data for a particular mobile device in that mobile device's system marker. Similarly, the wireless access points obtain information about the mobile device from the soft handshake processes and such information is stored in the system marker associated with that mobile device. The system marker information may be stored by the system marker module 214F under the mobile device's MAC address and available for future use.

In some embodiments, the information gathered from the wireless access points can help the telemetry system track the correct device with a MAC address. For example, the telemetry system and the digital system match a mobile device that shows to be in the same space (or determined location) and at the same time. The information obtained from the soft-handshake process as described above is added to the profile or system marker of the mobile device being tracked by the telemetry system, which allows for the devices with a corresponding MAC address to be tracked.

Figure 4:
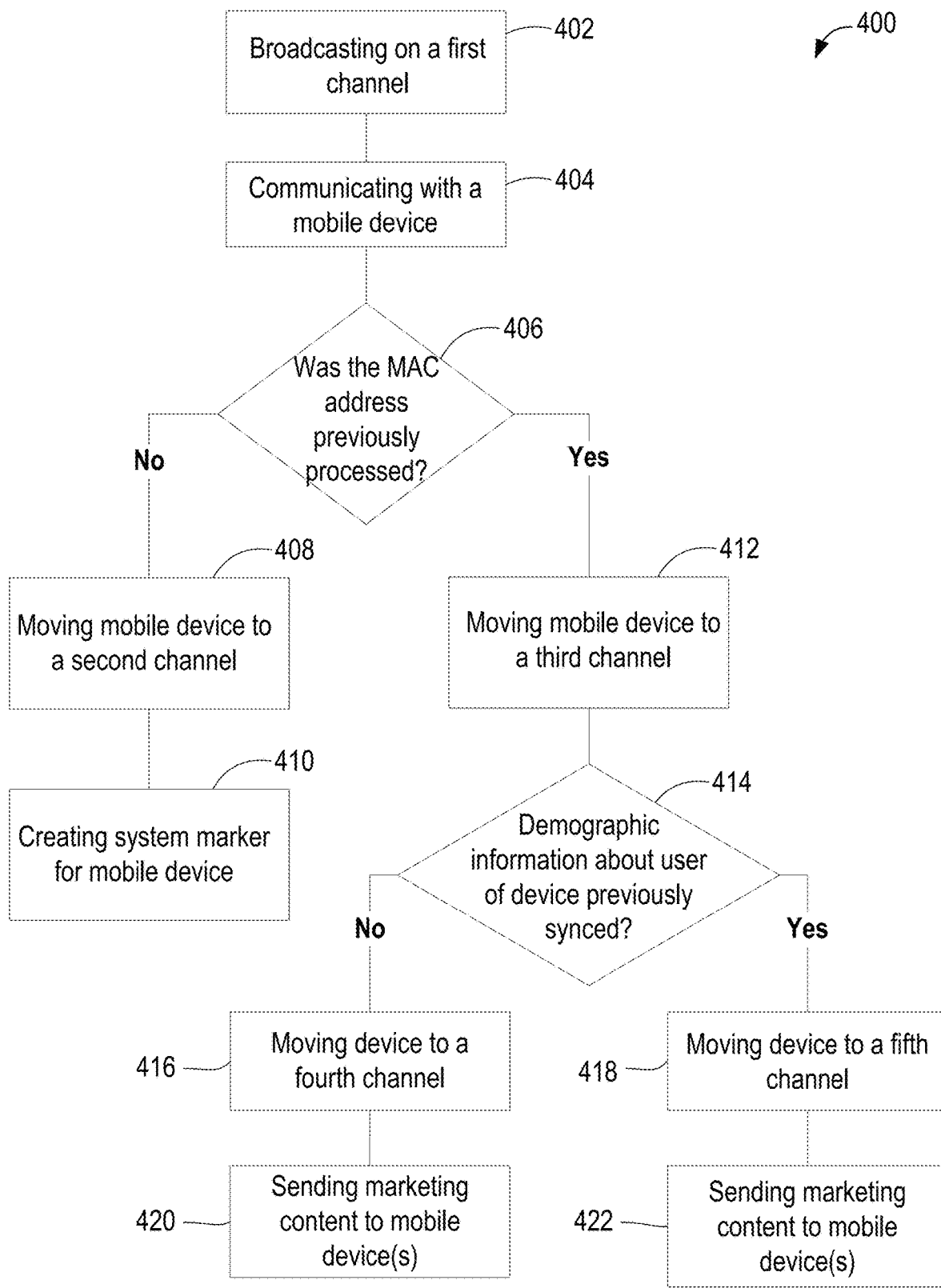
FIG. 4 illustrates an exemplary flowchart for dynamic manipulation and pooling of mobile devices.

FIG. 4 illustrates an exemplary flowchart 400 for dynamic manipulation and pooling of one or more wireless devices to optimize wireless channel utilization. The dynamic manipulation and pooling feature can optimize channel utilization by combining the mobile devices that wirelessly communicate with the wireless access points. In the broadcasting operation 402, a wireless access point may broadcast a wireless signal on a first channel or a first frequency and may actively seeking connections for any devices that have a Wi-Fi antenna. The various channels described in FIG. 4 are managed by the wireless access points. In some embodiments, each wireless access point may operate on its own wireless channel and may utilize the list of available frequencies maintained by the wireless access point module 214D as described in Section I above.

At the communicating operation 404, when a mobile device with MAC address enters the wireless range of the wireless access points, one of the wireless access points performs a soft handshake with the device and obtains from the device the MAC address and offline website data stored in the device or digital or browser files containing the user marketing demographic information. The offline website data may include cache, history, cookies, or browser history information. Once the device's MAC address and offline website data is obtained from the device, this information is passed, for example, through an SDK, to the logic controller in the computing device. The MAC address module 214G may use the logic controller to monitor the MAC addresses on the first channel. In some embodiments, a logic controller such as a Mikrotik RouterBOARD or Mikrotik controllers may be used for serial type interface into the networking functions of the switch.

At the determining operation 406, when a MAC address appears on the first channel, the MAC Address module 214G (shown in FIG. 2B) queries the computing device or other servers to determine whether that MAC address has been processed before. If the MAC Address module 214G determines that a new device with a MAC address has not previously appeared in the wireless footprint or has not previously performed a soft-handshake with a wireless access point, then the dynamic pooling module 214H (shown in FIG. 2B) performs the moving operation 408 and the system marker module 214F (shown in FIG. 2B) performs the creating operation 410 as shown in FIG. 4. The dynamic pooling module 214H may perform the various channel moving operations described in FIG. 4 using the same or different wireless access points. In some embodiments, the dynamic pooling module 214H may use the same wireless access point to perform the various channel moving operations. In some embodiments, the dynamic pooling module 214H may move a wireless device from a first channel of a first wireless access point to a second channel of a second wireless access point, and so on.

At the moving operation 408, if the new device with the MAC address has not previously appeared in the wireless footprint, then the dynamic pooling module 214H moves the new device with the MAC address to a second channel or second frequency. In some embodiments, the dynamic pooling module 214H may use the logic controller in the computing device 214 to perform the moving operations where a device is moved from one channel to another. In such embodiments, the logic controller in the computing device 214 can gather frequency or channel availability information from the Ethernet Switch. For example, the Ethernet switch can provide data used to determine the available one or more frequencies or one or more channels used to transmit the antenna detection signals. Since the Ethernet switch can track multiple channels, the Ethernet switch can provide wireless channel availability information to the computing device 214.

At the creating operation 410, the system marker module 214F (shown in FIG. 2B) may use the local controller to create an identifying information such as a system marker for the new devices that have not appeared in the wireless system before. The system marker may be a file with a unique identifier as a file name and may include information such as date and time of the session. The system marker can uniquely identify a mobile device and can be associated with the mobile device's MAC address. For example, the system marker file may include the MAC address and/or the IP address in its contents or the system marker file may include the MAC address as its file name. As another example, the system marker for a device may be an entry in a database associated with another entry such as a MAC address or location information about that same device. The created system marker can include or can be associated with additional information, such as location information, offline website data, or other information as described in this patent document. The system pools or combines MAC address in this way to be able to show all new MAC addresses that the system has processed over a period of time.

At the determining operation 406, if the MAC address module 214G determines that the device with a MAC address has previously appeared in the wireless footprint or has previously performed a soft-handshake with a wireless access point, then the computing device performs the moving operation 412 and the determining demographic information operation 414. At the moving operation 412, the dynamic pooling module 214H moves the device with the MAC address to a third channel or third frequency. The system marker of this device is located and updated with the date and time of the session by the logic controller in the computing device 214. In some embodiments, a session can include a starting time and an ending time and a starting date and an ending date when the device with the MAC address is in communication with a wireless access point. In some embodiments, a session can include a starting time and an ending time and a starting date and an ending date when the device with the MAC address is stationary or moving within the wireless range of the digital and telemetry systems. The computing device 214 can record the time when a mobile device enters the wireless range of the system 100 and the time when the mobile device exits the wireless range of the system 100.

At the determining demographic information operation 414, the demographic information module 214J (shown in FIG. 2B) determines whether the offline website data such as marketing, digital, web, or browser history information was previously synced with or sent to the demographic information server 226 (shown in FIG. 2B) using for example, a GUI within the computing device 214. In some embodiments, the fact that a system marker exists for a device can indicate that the device's offline website data, if any, was previously synced.

At the determining demographic information operation 414, if the demographic information module 214J determines that the offline website data was not previously synced, then the dynamic pooling module 214H performs another moving operation 416 and moves the device to a fourth channel or fourth frequency. In some embodiments, virtual LANs (VLANs) from 1 to 99,999 may be included in or can operate on the fourth channel. VLANs can be managed by the wireless access points, the Ethernet switch, or the logic controller. VLAN configurations may be determined by the logic controller's ability to assess the different marketing or demographic information, and pool together devices or users that are similar. For example, within programmatic advertising there may be different marketing markers that different advertisers use to find particular customers. The different marketing markers are demographic identifiers and may include, for example, gender, age, or income. Further, marketing markers can be associated with or based on the offline website data obtained from the mobile devices. The marketing markers may be sent by the demographic information server 226 to the computing device 214 based on the offline website data and/or MAC address information that the computing device 214 sends to the demographic information server 226. The marketing marker information can be used by Ad Exchanges during digital advertising opportunities. For example, based on the offline website data or a previously processed MAC address, the demographic information server 226 can send to the computing device 214 a marketing marker indicating that the offline website data may be associated with a 20 to 25 year-old male mobile device user. The computing device 214 can store the marketing markers in the system marker of a mobile device.

As each of the third-party provided information, such as demographic information, marketing marker, or programmatic advertising information, is brought into the logic controller ecosystem, the demographic information module 214J searches the marketing marker for other similar users inside this wireless device tracking system's wireless range. For example, as mentioned above, based on the MAC addresses and/or offline website data provided by the mobile devices and based on the marketing marker information sent by the demographic information server 226, the demographic information module 214J can determine one or more users of the mobile devices are 20 to 25-year-old males. If no other users have the same marketing or third-party provided user information, then the mobile devices may be moved onto a different channel with the one or more marketing markers.

After the moving operation 416, if a channel has already been set-up for the one or more marketing or third-party information marker signature, then the new MAC address is added to that existing channel that may contain MAC addresses with matching third-party marketing information. Subsequently, the MAC address or addresses that match one or more marketing markers are collated and offered to Ad Exchanges or digital marketing agencies so that direct programmatic marketing (e.g., advertising) can be sent to devices that pass through the wireless device tracking system's wireless footprint. As mentioned above, in some embodiments, the VLANs from 1 to 99,999 may be included in or may operate on the fourth channel associated with the moving operation 416.

At the sending operation 420, with each VLAN creation the computing device 214 can choose to create and/or send selective information targeted to one or more mobile devices on a splash page to the one or more mobile devices. The splash page may include custom content that can be sent to one or more mobile devices associated with each or any VLAN or SSID or channel configuration. The content of splash page can be associated with the marketing marker or any other information obtained from the offline website data. The content of splash page can be obtained from Ad Exchanges or digital marketing agencies. Thus, at the sending operation 420, at least one mobile device associated with the fourth channel can be provided with a selective information targeted to the mobile device (e.g., an advertisement displayed on a splash page) based on the demographic information obtained about that mobile device. In some embodiments, the server system is configured to provide in real-time location information and demographic information about each mobile device to one or more servers operated by programmatic advertisers.

If the demographic information module 214J determines that no other MAC address can be pooled together with the MAC address of one of the devices, for example, device A, then a new VLAN is created and the MAC address for device A is added to it. If any other MAC addresses match the marketing criteria for the MAC address for device A, then the other MAC addresses can be added to this newly created VLAN. Thus, one or more mobile devices associated with one or more marketing markers can be provided with an advertisement based on the obtained demographic information.

At the determining demographic information operation 414, if the demographic information module 214J determines that the offline website data was previously synced, then the dynamic pooling module 214H performs another moving operation 418 and moves the device to a fifth channel or fifth frequency. In some embodiments, VLANs from 1-99,999 may be included in or may operate on the fifth channel. VLAN configurations may be determined by the logic controller's ability to assess the different marketing or demographic information, and pool together devices or users that are similar. Since the offline website data was previously synced, the computing device 214 has the marketing markers associated with the mobile devices moved to the fifth channel or to a channel used to communicates with other mobile devices with the same or similar marketing markers. Based on the marketing markers, if the demographic information module 214J determines that no other MAC address can be pooled together with the MAC address for one of the devices, for example, device A, then a new VLAN is created and the MAC address for device A is added to it. If any other MAC addresses match the marketing criteria for the MAC address for device A, then the other MAC addresses can be added to this newly created VLAN. The MAC address or addresses that match one or more marketing markers are collated and offered to Ad Exchanges or digital marketing agencies so that direct programmatic marketing (e.g., advertising) can be sent to devices that pass through the wireless device tracking system's wireless footprint.

At the sending operation 422, with each VLAN creation the computing device 214 can choose to create and/or send selective information targeted to one or more mobile devices on a splash page displayed on the one or more mobile devices. The splash page may include custom content that can be sent to one or more mobile devices associated with each or any VLAN or SSID or channel configuration. The content of splash page can be associated with the previously obtained marketing marker or any other information obtained from the offline website data. The content of splash page can be obtained from Ad Exchanges or digital marketing agencies. Thus, at the sending operation 422, at least one mobile device associated with the fifth channel can be provided with a selective information targeted to the mobile device (e.g., an advertisement displayed on a splash page) based on the demographic information such as the previously obtained marketing marker for that mobile device.

In some embodiments, the newly created VLAN associated with the fourth and fifth channels may cause the demographic information module 214J to create a log file that may include the demographic information (e.g., marketing marker), MAC address, IP address, channel, location and date or time stamp. The IP address of a device can be obtained based on the information obtained from the soft-handshake and the mining licenses procured. The created log file may be sent to the demographic information server 226 associated with a demographic mining system. This log information may also be sent to another server or third-party marketing server, such as an Ad Exchange SDK, or security SDK. In some embodiments, the custom content can be an advertisement provided by the third-party programmatic Ad Exchange server based on the demographic information, such as marketing marker.

One benefit of defining and pooling the MAC address based on demographic information known about the MAC address or based on a similarity between users of the mobile device is that pooling allows for real-time communication with or real-time access of data collected about users of mobile devices. Each IP or VLAN can include mobile devices that are associated with a real-time location information, a system marker session file, offline website data, other the user information file, and/or MAC address or IP address. Thus, the demographic information module 214J can send a request to one or more other servers to obtain or provide information about the users associated with the mobile devices. For example, each system marker can be sent to and processed by a demographic information server 226 (shown in FIG. 2A and further discussed in Section V below). As further discussed in Section V, as the computing device 214 creates and archives these files they can also be processed by another local server 224 (shown in FIG. 2A) as an active device. The local server 224 can send the processed files or data to third-party marketing servers as a request to perform operations, such as advertising. These requests may be sent through the servers and SDKs and provided to customers that want to advertise to mobile devices having certain marketing characteristics. For example, information can be supplied to customers in real time for the customers to send an advertisement to one or more mobile devices. In another example, information can be supplied to customers in a batch for the hour or day or week or month or year. In another example, information can be supplied to customers across different regions or over different time periods.

The real-time location information, offline website data, or other the user information file can be collected into the system marker file for this session and stored under a device's MAC address. The computing device 214 may pool together archive information into its logic controller associated with how a particular MAC address is pooled or queried by different third-party marketing servers. In some embodiments, the computing device 214 can keep relevant system marker related information in queue for 72 hours allowing for different third-party marketing servers to access real-time data in different ways.

In some embodiments, after the dynamic pooling module 214H performs the moving operation 418, the dynamic pooling module 214H can determine whether any of the MAC addresses or VLAN configurations are utilized by the third-party marketing servers. If they are not utilized, then MAC addresses can stay in the same configuration until they are utilized. In some embodiments, when connection with the device is lost, the system marker file is updated with the latest date or time stamp and system marker module 214F closes the file associated with the system marker. On the other hand, if the MAC addresses or VLAN configurations are utilized by the third-party marketing servers for sending an advertisement to the devices associated with the MAC addresses or VLAN, then the system marker module 214F logs the configuration and client access identification markers into the file associated with the system marker for this session. The client access identification markers include marketing information obtained by third-party companies related to devices whose MAC address are retrieved by the wireless device tracking system. The computing device can merge the client access identification marker with the information included in the system marker.

The computing device 214 maintains its communication with the mobile device. Once connection with MAC address is lost, the system marker module 214F updates the system marker file with the latest date or time stamp and closes the file associated with the system marker.

In some embodiments, the computing device 214 may utilize an SDK connected to the logic controller that may include the system marker files for all of the active devices the system is tracking, and an active pool of the new devices the digital system is processing through the server system and the demographic information system (as further described in Section V below). In some embodiments, the logic controller can perform the operations described above for the MAC address module 214G, the dynamic pooling module 214H, and the demographic information module 214J. The logic controller may be housed in the local rack mounted computing device, may be tasked with pooling the MAC addresses that the digital system is monitoring into different SSIDs or VLANS depending on the device and what the computing device 214 knows about that device. The logic controller may pool MAC address per the information the logic controller can ascertain about the device and may use both public and hidden SSIDs to achieve its system goals. For example, the hidden SSIDs may be the channels that the mobile devices are moved onto as the system processes them, as described in FIG. 4. In some embodiments, channel 1 may be a public SSID, and channels 2-99 may be hidden and are only available to join when the system moves a mobile device onto those channels. In some embodiments, the moving of mobile devices from one channel to another may be done with a logic controller, for example from Mikrotik, or the Splash Page or Hot Spot Config. System may pool MAC address and per the information the system knows about the device, and utilizes different VLAN channels, under the same SSID, to achieve its system goals. In some embodiments, the computing device controls the Ethernet switch operations through the computing device, into the Mikrotik logic controller, into the wireless LAN controller, and into the Ethernet switch. Ultimately, the computing device can control the GUI of the switch to achieve the system goals set in the logic controller.

III. Server System

As mentioned above, in FIG. 2A, the computing device 214 queries the wireless access points 208a-208d of the digital system to determine the frequencies that are open and unused by the digital system and/or by other devices or systems operating in the wireless range of the wireless device tracking system. Such a system allows the computing device 214 to choose as many different frequencies as possible to use for the antenna detection system. In some embodiments, this can be done by prioritizing the system to notice an opening in the spectrum and ping at those frequencies when available.

As explained in FIG. 4 above, the computing device 214 may control, through an SDK, the digital systems ability to control the traffic or channel loading of the system. The logic control of the SDK states that as devices are recognized and processed, it may pool or combine it with other processed devices onto as few channels as possible, leaving open channels or frequencies that can be used for the ping. Some channels, or frequency blocks, may be removed from the digital system operation pool so that the system may have open frequency to operate the telemetry system. This may be done in the Ethernet Switch GUI or wireless LAN controller GUI of the digital system.

In some embodiments, the computing device 214 may have SDKs that obtains information from the telemetry system, the digital system, and the camera system (described below in Section IV) to track a single device. The computing device 214 collects and stores the pertinent data onto the storage file saved under the system marker associated with the device. The stored file may include the MAC Address, offline website data, current location or tracking information, all past location or tracking information if available, offline website data, the demographic information received from the mining license information, such as marketing markers, and any other pertinent information.

The computing device 214 may provide certain information obtained from a mobile device to a local server 224 for marketing related operations. The local server 224 may store all system marker files its network or networks have processed inside the MAC address folders. The local server 224 receives from the computing device 214, through SDK, the MAC address information and offline website data obtained from the devices the computing device 214 is tracking. The local server 224 may house the interface for the demographic mining license. The demographic mining license associated with the local server 224 can use the MAC address and offline website data to sync with the demographic information server 226 to receive the latest demographic information for the mobile device, such as marketing markers, to be used in commercial or advertisement sales efforts. The local server 224 may house the interface for programmatic mobile or digital Ad server interface. The local server 224 may also send back to the computing device 214, either through API or SDK, the information necessary for third-party marketers to advertise to various mobile device that pass through the wireless device tracking system.

The computing device 214 allows for remote access from local server 224 and network operations center (NOC) (not shown in FIG. 2A). In some embodiments, a master server (not shown in FIG. 2A) may monitor, control, enhance, calibrate, and/or update one or more local servers 224 under its control. The master server can store all system marker files its network or networks have processed inside the MAC address folders.

As mentioned in Section II above, the computing device 214 may constantly monitor, through SDK, the digital system for new devices recognized by the wireless device tracking system. When the digital system achieves a soft handshake with a wireless device, the computing device 214 can obtain the MAC address and offline website data from the wireless device. The computing device 214 can search its hard drive or a database for information associated with the received MAC address or offline website data. If one does not exist, the computing device 214 can create a folder for the received MAC address, offline website data and generate a system marker identification (ID). Once the folder exists, a new and active system marker file is created by the computing device 214 to collect all of the pertinent information for this session. If a folder already exists, the computing device 214 then moves to creating an active system marker file for this session. The active system marker file is kept open for the entire time the mobile device with the MAC address remains inside the network.

In some embodiments, the computing device 214 saves into the system marker of a mobile device all pertinent data that the platform generates from all its sub systems. For example, the computing devices 214 stores in the system marker mobile device data such as MAC address, offline website data, demographic information such as marketing markers, date or time stamp of entrance (session start) and exit (session end) of the system network or footprint. The computing device 214 may also stores in the system marker additional digital network related information for the mobile device such as device RSSI levels or Access Point (AP) communication. The computing device 214 may also save in the system marker additional telemetry system related information for the mobile devices such as location information, the amount of time that the device has stopped at a location, location information about the stops made (e.g., name of business, etc.), or movement or migratory information collected by the system for the entire time the device was tracked.

In some embodiments, a session ends when all three of the tracking systems, such as the telemetry, digital, and camera systems, can no longer communicate or locate a device. However, if any of the three systems can maintain a location on the device then the system marker remains open and the information is collected. When all three systems lose contact, the session may end. In some embodiments, when the digital system achieves a soft handshake with a mobile device, the process of tracking and gathering of information about that mobile device can start.

The demographic system related information may include a log of the information being collected from the device(s) in communication with the wireless device tracking system, a log of that information can be synced with demographic information server 226 to gather updated information, and a log of the API or SDK file exchange package was updated with this sessions location information and the latest demographic information. The server system may include a log of all activity regarding a device MAC address and its file creation or processing, a log of any outside connections utilizing the data (e.g., Ad exchanges, data companies, security, commerce, etc.) in real time or batch data allocations, the logic controller completing all system tasks.

IV. Camera System

As shown in FIG. 1, in some embodiments, the wireless device tracking system 100 also includes a camera system 112 mounted on the support structure 102. The camera system may include one camera or multiple cameras that point at different angles to obtain videos from different locations. As shown by dotted lines in FIG. 1, multiple cameras are configured to obtain video of multiple areas that includes at least some of the plurality of mobile devices 118a-118d in vehicles 116a-116c. The camera system 112 is communicably coupled to or in communication with the computing device 114. The computing device 114 receives, from the one or more cameras, video of at least some of the plurality of mobile devices 118a-118d. The camera system may be used by the wireless device tracking system to obtain, process, and record video from a location. In an exemplary embodiment, the camera in the camera system may be a high-definition camera, internet protocol based camera, a mesh-capable camera with pan or zoom capabilities, or a camera with night-vision capabilities.

The camera system 112 can determine the locations of the mobile devices appearing within the field of view of the cameras. The computing device 114 may be integrated, using an SDK, with a camera system so that the computing system 114 can obtain and merge the location information (and other information) from the camera system with location information obtained from the digital and telemetry systems. The camera system 112 can be installed so they can survey as much of the wireless coverage footprint as possible for the individual location topography and layout. The camera system can be integrated with license plate or vehicle or facial recognition software. The camera system may assist in following the system marker in the same manner of operation as facial recognition software that tracks individual faces.

The computing device 114 controls the cameras in the camera system. In some embodiments, the computing device 114 communicably coupled to or in communication with the camera system 112 can verify the camera system's location tracking information and hand off such information from one wireless device tracking system located on one traffic intersection to another device tracking system that may be located on another location, such as next to freeways, or close to homes, or close to malls. The computing device 114 may include a GUI that interfaces with the one or more cameras in the camera system 112. The computing device 114 may also communicate, using an SDK, with the telemetry and digital systems, and operates off of a logic controller build into the system to help share information from one wireless device tracking system to another.

In some embodiments, if the location determination module of the computing device 114 determines that the digital and telemetry systems provide a same location for a mobile device, then the computing device 114 can search the camera system for image inside the same space (or location). In such embodiments, the location determination module of the computing system 114 can obtain location of the mobile device from the camera system and determine that the mobile device location obtained from the telemetry, digital and camera system refer to the same location. If a match is found it is tracked for, for example, one minute to make sure they all three systems—the digital, telemetry, and camera systems—track the mobile device moving through space or time and to show them in three independently determined locations or times with the three systems. If the match does not show them in the same place for three location readings from the three different systems, then the system continues to try and find a match. If the system shows them in the same location or time at three independently verified or determined locations, from the three systems combined, then the mobile devices can be tagged by the system as the same device. This is done so that the system marker can be assigned to a particular image the camera system is tracking, for example, a human being, a bicycler, or an automobile, allowing for the image from the camera system to be shared in real time from one wireless device tracking system to the next.

As shown in FIG. 2A, the computing device 214 also hosts communication with one or more servers for global system control. In some embodiments, the logic controller (not shown in FIG. 2A) is housed in the computing device 214 and communicates with the local server 224. As the system has a match in the camera system, described above, then the local server 224 can be notified of the system markers in queue. If the same device shows up on the camera system of a neighboring wireless device tracking system, then the system marker can be shared with other wireless device tracking systems and may be re-opened for comprehensive movement tracking throughout the network.

In an exemplary embodiment, a computing device 114 or a server in a wireless device tracking system 100 may interface with another computing device or another server of another wireless device tracking system. The interface allows for the same target to be recognized in the other wireless device tracking system and trigger communications sharing. When the same target is recognized, the last system marker file is shared, for example, via the internet, from the prior wireless device tracking system's computing device to the current wireless device tracking system's computing device. This allows for system markers to be comprehensively updated with the targets entire movement through the network When the computing system 214 combines or pools information obtained from the telemetry system, digital system, and camera, the information is processed, matches may be found, and the combined data can be collected into a file associated with the system marker. When the system has triple processed a mobile device, using for example, the telemetry system, the digital system, and the camera system that all match on the same mobile device, it then includes a camera system marker in that system marker. Thus, if that same camera system marker, such as license plate, vehicle, pedestrian, is recognized in another wireless device tracking system, the computing device 214 at that wireless device tracking system can re-open the latest system marker file and update it. This allows for triple verification of location data and easily transfer pertinent data as a target device travels through the network The camera system assists the wireless access points and telemetry systems by assigning each car on the road it recognizes the appropriate camera system marker. The camera systems recognition software can be used to process a car as it moves from one wireless device tracking system to the next. By doing so, the system can then calibrate itself with all of the pertinent information about that car since it was already processed before. So as a mobile device travels from one wireless device tracking system to another, the next wireless device tracking system can be provided with the latest system marker file from one wireless device tracking system to the next to constantly track the devices. In some embodiments, the computing device 214, through SDK, uses the camera system to verify system tracking information and to hand off the camera and tracking information from wireless device tracking system to the next wireless device tracking system. A benefit of such a system is that it provides an additional level of verification for tracking devices properly and helps omit duplicate data sets.

As the camera system begins to track a device the system tags the system marker with this information. As the system has a match in the camera system, described above, then the server is notified of these system markers in queue. If the same device shows up on the camera system of a neighboring wireless device tracking system, then the system marker is shared and may be re-opened for comprehensive movement tracking throughout the network. As the system works together, and as people move through one wireless device tracking system to another, the system uses the camera system to help share data quickly from one location to the next. As the system recognizes a car that has been assigned a system marker for the day, it can then share that data set from one server to the next, as necessary, to track the device throughout the day.

In some embodiments, the camera system may include thumbnail image of device when match is found, tracking data of the system as it follows the device, logs of any hand-offs from one wireless device tracking system to the next after a match is found.

V. Demographic Information System

As discussed in this patent document, the computing system 214 controls the digital system and can obtain from a mobile device the MAC address, IP address, and/or offline website data. In some embodiments, the computing device 214 may send the information obtained from a mobile device to another server 224, such as a local server, to have the server 224 process the information obtained from the mobile device with information obtained from a demographic information server 226. The demographic information server 226 can also be referred to as the demographic mining license server. The computing device 214 may send mobile device related information (e.g., MAC address, or offline website data) to and receive demographic related information (e.g., marketing marker) from a local server 224 or the demographic information server 226 through a network 228, such as the Internet. For instance, the MAC address and/or offline website data obtained from a mobile device is synced with the demographic information server 226 to obtain from the demographic information server 226 demographic information about the mobile device. The demographic information, such as marketing markers is received back from the server 224 into the computing device 214. The demographic information received by the computing device 214 may be added to the system marker for a more comprehensive picture of the device or target. The computing device 214 may respond to any query or request the server 224 receives from third-party marketing servers. Based on the received demographic information, the computing device 214 can send to one or more mobile devices a splash page that may include custom content, such as an advertisement, as described in FIG. 4 after the moving operations 416 and 418.

The local server 224 receives requests from the computing device 214 for new data to be synced for a new mobile device. The local server 224 hosts the API and SDK plugins from both the demographic information server 226 and other third-party marketing servers, such as Ad exchanges, data companies, marketing agencies. Thus, for example, a third-party marketing server can obtain a marketing marker from local server 224 or demographic information server 226 and can send the marketing marker to programmatic Ad Exchange server or marketing company. The third-party marketing servers may request real-time query, batch query, and migratory studies. A marketing request interface may be hosted in the server 224. The server 224 can be controlled from the regional network operations center (NOC). In some embodiments, the operations associated with the local server 224 can be performed by the computing device 214.

The demographic information server 226 may be in communication with the server 224 via, for example, the Internet 228. In some embodiments, the demographic information server 226 may be connected to the server 224 via an API or an SDK. The demographic information server 226 may query the server 224, or other servers, to provide demographic data associated with the device MAC address and/or offline website data obtained from the mobile device. The demographic information server 226 may resolve queries by responding to requesting server with the stored demographic data it has for the device or target in question. The demographic information server 226 may also provide verification data that can be provide to clients showing the demographic data is valid and accurate.

Figure 3:
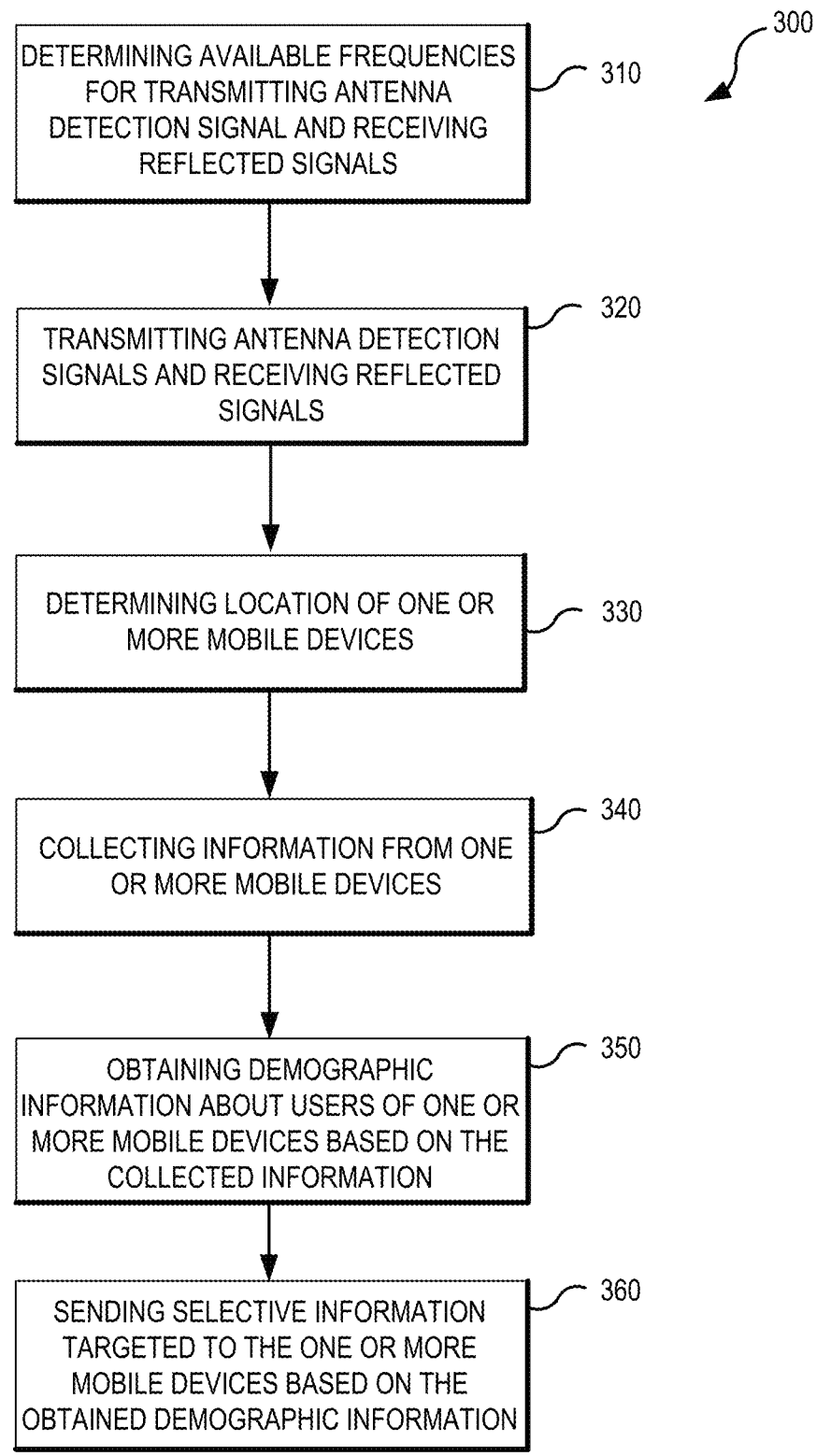
FIG. 3 illustrates an exemplary flowchart for the wireless device tracking system.

FIG. 3 shows an exemplary flowchart of the wireless device tracking system. In some embodiments, an exemplary method 300 for tracking wireless devices includes a determining operation 310 where a computing device 214 may determine, using a first signal generator, a first set of available wireless frequencies to use for a first antenna and a first set of telemetry antennas. In some embodiments, the determining operation 310 may also include a computing device 214 determining, using a plurality of wireless access points, a second set of available wireless frequencies to use for a second antenna and a second set of telemetry antennas. In the transmitting and receiving operation 320, the computing device 214 may instruct the first signal generator to periodically generate a first antenna detection signal using the first set of available wireless frequencies. Next, the first antenna transmits the periodically generated first antenna detection signal. Subsequently, the first antenna and the first set of telemetry antennas receive a first set of reflected signals wirelessly reflected from one or more mobile devices. In some embodiments, the transmitting and receiving operation 320 may also include the computing device 214 instructing a second signal generator to periodically generate the second antenna detection signal using the second set of available wireless frequencies. As a result, the second antenna transmits the periodically generated second antenna detection signal. Subsequently, the second antenna and the second set of telemetry antennas receive a second set of reflected signals wirelessly reflected from one or more mobile devices.

In the determining operation 330, the computing device 214 determines or calculates the location of one or more mobile devices in response to receiving either the first set of reflected signals or the second set of reflected signals or both the first and second set of reflected signals. In some embodiments, the determining operation 330 may include determining, using the computing device 214, the location(s) of the one or more mobile devices using the first and the second signal strength indicators measured by the first signal generator. The first signal strength indicator for the first antenna detection signal can be measured using the first signal generator at a predetermined distance from a first transmitter of the first antenna. The second signal strength indicator for each of the first set of reflected signals can be measured using the first signal generator. The computing device 214 may use Equation 1 and the signals transmitted and received by the first antenna and the first set of telemetry antennas to determine one or more first locations of the one or more mobile devices.

In some embodiments, the determining operation 330 may also include determining the one or more locations of the one or more mobile devices using the third and the fourth signal strength indicators measured by the second signal generator. The third signal strength indicator for the second antenna detection signal is measured using the second signal generator at a predetermined distance from a second transmitter of the second antenna. The fourth signal strength indicator for each of the second set of reflected signals is measured using the second signal generator. The computing device 214 may use Equation 1 and the signals transmitted and received by the second antenna and the second set of telemetry antennas to determine one or more second locations of the one or more mobile devices. In some embodiments, the computing device 214 can determine that for each of the one or more mobile devices a first location from the one or more first locations is same as a second location from the one or more second locations.

At the collecting operation 340, a computing device 214 may use the plurality of wireless access points to collect one or more MAC addresses and one or more offline website data from the one or more mobile devices during soft-handshake. At the obtaining operation 350, the computing device may send a collected MAC addresses and/or the offline website data of the one or more mobile devices to another server and may receive from another server demographic information related to users of the mobile devices.

An example of demographic information includes marketing identifiers (or marketing markers) that can provide demographic information about the users of the mobile devices. As mentioned above, marketing identifiers can describe, for example, gender, age, or income of the users of the mobile devices. The demographic information can be provided to Ad Exchanges or digital marketing agencies. Based on the demographic information, the Ad Exchanges or digital marketing agencies can provide selective information targeted to the one or more mobile devices. An example of selective information can include an advertisement displayed on a splash mage of a mobile device. At the sending operation 360, the computing device 214 can send selective information targeted to one or more mobile devices based on the obtained demographic information about the users of the one or more mobile devices. The selective information can include, for example, an advertisement displayed on a splash page of at least one mobile device as further described in the sending operations 420 and 422 of FIG. 4. Thus, for example, at the sending operation 360, the computing device can send to at least one mobile device selective information based on the obtained demographic information about a user of the at least one mobile device.

The exemplary method 300 may also include a combining and advertising operation. At the combining and advertising operation, the computing device 214 can determine that at least two mobile devices are associated with the same marketing information. The same marketing information can include a same demographic information about the users of the at least two mobile devices. The at least two mobile devices can be combined onto a same virtual local area network (VLAN) managed by the wireless access points. Next, the computing device can send to the at least two mobile devices on the same VLAN a selective information, such as an advertisement on a splash page of the two mobile devices based on the same marketing information of the at least two mobile devices.

In some embodiments, exemplary method 300 may also include receiving, from the one or more cameras, video of at least some of the mobile devices located within a field of view of the one or more cameras and obtaining, using the one or more cameras, location information of the at least some of the mobile devices.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. An outdoor wireless network for delivering location information of a mobile device in real-time, the outdoor wireless network comprising:
    a telemetry system to locate and track a location of the mobile device, comprising:
        a first antenna mounted on a support structure, the first antenna configured to transmit a periodically generated first antenna detection signal and to receive a first set of reflected signals from one or more wireless antennas of the mobile device;
        a second antenna mounted on the support structure, the second antenna configured to transmit a periodically generated second antenna detection signal and to receive a second set of reflected signals from the one or more wireless antennas of the mobile device;
        a first set of telemetry antennas mounted on the support structure and configured to receive the first set of reflected signals;
        a second set of telemetry antennas mounted on the support structure and configured to receive the second set of reflected signals;
    a digital system to wirelessly communicate with the mobile device to obtain identification information from the mobile device, the digital system comprising:
        a plurality of wireless access points mounted on the support structure and configured to transmit wireless signals to and receive wireless signals from the mobile device;
    a computing device in communication with the first and second antennas, the first set of and second set of telemetry antennas, and the wireless access points, wherein the computing device comprising a processor configured to perform a method comprising:
        determining a first set of available wireless frequencies to use for the first antenna and the first set of telemetry antennas;
        determining a second set of available wireless frequencies to use for the second antenna and the second set of telemetry antennas;
        instructing, using the first and second set of available wireless frequencies, a first signal generator and a second signal generator to periodically generate the first and second antenna detection signals for transmission by the first and second antennas, respectively;
        determining the location of the mobile device in response to the receiving of the first set of reflected signals or in response to the receiving of the second set of reflected signals;
        obtaining, using the wireless access points, media access control (MAC) address and offline website data from the mobile device, wherein the offline website data includes cached data, one or more cookies, or browser history information;
        obtaining, from a server based on the collected MAC address and the offline website data, demographic information about a user of the mobile device; and
        sending to the mobile device selective information based on the obtained demographic information about the user of the mobile device.

2. The outdoor wireless network of claim 1, wherein the selective information includes an advertisement displayed on a splash page of the at least one mobile device.

3. The outdoor wireless network of claim 1, wherein the method further comprises:
    determining that at least two mobile devices are associated with the same demographic information about users of the at least two mobile devices;
    combining onto a same virtual local area network (VLAN) the at least two mobile devices that are in communication with the wireless access points, wherein the VLAN is managed by the wireless access points; and
    sending to the at least two mobile devices on the same VLAN a second selective information based on the same demographic information about users of the at least two mobile devices.

4. The outdoor wireless network of claim 3, wherein the second selective information includes an advertisement displayed on splash pages of the at least two mobile devices.

5. The outdoor wireless network of claim 1, wherein
    the first signal generator is configured to receive the first set of reflected signals from the first antenna and the first set of telemetry antennas; and
    the second signal generator is configured to receive the second set of reflected signals from the second antenna and the second set of telemetry antennas.

6. The outdoor wireless network of claim 5, wherein the location of the mobile device is determined by:
    measuring, using the first signal generator, a first signal strength indicator of the first antenna detection signal at a predetermined distance from a first transmitter of the first antenna;
    measuring, using the first signal generator, a second signal strength indicator of each of the first set of reflected signals; and
    determining a first location of the mobile device using the first and the second signal strength indicators.

7. The outdoor wireless network of claim 6, wherein the location of the mobile device is determined by:
    measuring, using the second signal generator, a third signal strength indicator of the second antenna detection signal at a predetermined distance from a second transmitter of the second antenna;
    measuring, using the second signal generator, a fourth signal strength indicator of each of the second set of reflected signals; and
    determining a second location of the mobile device using the third and the fourth signal strength indicators.

8. The outdoor wireless network of claim 7, further comprising:
    determining that the first location is same as the second location.

9. The outdoor wireless network of claim 1, wherein the first signal generator is used to determine the first set of available wireless frequencies, and the wireless access points are used to determine the second set of available wireless frequencies.

10. The outdoor wireless network of claim 1, further comprising:

one or more cameras mounted on the support structure and in communication with the computing device, wherein the one or more cameras are configured to obtain video of the mobile device within a field of view of the one or more cameras, and the processor of the computing device is configured to perform the method further comprising:
- receiving, from the one or more cameras, video of the mobile device; and
- obtaining, using the one or more cameras, location information of the mobile device.

11. The outdoor wireless network of claim 1, wherein the location of the mobile device is determined to be within three feet of actual location of the mobile device.

12. The outdoor wireless network of claim 1, wherein the first antenna is a dielectric lens antenna and the second antenna is a parabolic antenna.

* * * * *